(12) United States Patent
Chavrier et al.

(10) Patent No.: US 12,473,881 B2
(45) Date of Patent: Nov. 18, 2025

(54) METHOD FOR OPERATING A VEHICLE AND VEHICLE OPERATED BY SUCH A METHOD

(71) Applicant: Volvo Truck Corporation, Gothenburg (SE)

(72) Inventors: Philemon Chavrier, Lyons (FR); Renaud Laperriere, Lyons (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/592,963

(22) Filed: Mar. 1, 2024

(65) Prior Publication Data

US 2024/0295207 A1 Sep. 5, 2024

(30) Foreign Application Priority Data

Mar. 3, 2023 (EP) .................................... 23160009

(51) Int. Cl.
*F02N 11/08* (2006.01)

(52) U.S. Cl.
CPC .... *F02N 11/0866* (2013.01); *F02N 2200/061* (2013.01); *F02N 2250/02* (2013.01)

(58) Field of Classification Search
CPC .......... F02N 11/0866; F02N 2200/061; F02N 2250/02; F02N 5/04; F02N 2011/0885; F02N 11/04
See application file for complete search history.

(56) References Cited

U.S. PATENT DOCUMENTS 1,778,886 A * 10/1930 Chilton ..................... F02N 5/04
123/179.22
6,198,621 B1 * 3/2001 Saito ..................... H01G 11/28
29/25.03

(Continued)

FOREIGN PATENT DOCUMENTS

DE 102012018730 A1 3/2014
EP 2570284 A1 3/2013

(Continued)

OTHER PUBLICATIONS

Tohatsu 003-11151-6BE1_MFS2.5-3.5C_EUR_EN_body_241018N.book (Year: 2025).*

(Continued)

*Primary Examiner* — Carl C Staubach
(74) *Attorney, Agent, or Firm* — Sage Patent Group

(57) ABSTRACT

A vehicle comprises an internal combustion engine, a battery, an alternator, a starter, configured to start the internal combustion engine, a charger, distinct from the battery, and an electrical energy storage system, connected to the starter and to the charger, and distinct from the battery. To allow the engine to be started in case of a battery failure, a method for operating the vehicle comprises: starting the internal combustion engine, measuring a state of charge of the battery, comparing the measured state of charge with a predetermined threshold value, if the measured state of charge is lower than the predetermined threshold value: charging the electrical energy storage system with the charger, then starting the internal combustion engine with the starter, by powering the starter with the electrical energy storage system, when restarting the internal combustion engine is required.

8 Claims, 3 Drawing Sheets

(56) References Cited

U.S. PATENT DOCUMENTS

| | | | | |
|---|---|---|---|---|
| 6,202,615 | B1* | 3/2001 | Pels | F02N 19/04 |
| | | | | 307/10.6 |
| 8,818,592 | B2* | 8/2014 | Dessirier | B60L 58/22 |
| | | | | 701/99 |
| 10,220,835 | B2* | 3/2019 | Jorgensen | B60W 20/50 |
| 10,876,510 | B2* | 12/2020 | Ciaccio | H01M 10/44 |
| 11,146,097 | B2* | 10/2021 | Franzén | H02J 7/345 |
| 11,506,719 | B2* | 11/2022 | Chen | F02N 11/0866 |
| 2004/0217723 | A1* | 11/2004 | Cai | F02N 11/0866 |
| | | | | 318/268 |
| 2006/0108954 | A1* | 5/2006 | Sebille | H02J 7/1438 |
| | | | | 318/108 |
| 2011/0319214 | A1* | 12/2011 | Showalter | F02N 15/02 |
| | | | | 475/149 |
| 2012/0253576 | A1* | 10/2012 | Tamagawa | B60W 10/08 |
| | | | | 180/65.265 |
| 2013/0066499 | A1* | 3/2013 | Niste | B60W 20/50 |
| | | | | 180/65.265 |
| 2013/0181516 | A1* | 7/2013 | Phan | B60L 58/20 |
| | | | | 307/10.7 |
| 2013/0264869 | A1* | 10/2013 | Klinkig | B60R 16/033 |
| | | | | 307/10.6 |
| 2015/0217761 | A1* | 8/2015 | Christman | F02N 11/0825 |
| | | | | 701/22 |
| 2015/0300307 | A1* | 10/2015 | Setterberg | H02J 7/1423 |
| | | | | 701/113 |
| 2015/0349582 | A1* | 12/2015 | Maeno | B60L 58/20 |
| | | | | 320/101 |
| 2019/0256076 | A1* | 8/2019 | Roiu | B60K 6/48 |

FOREIGN PATENT DOCUMENTS

| | | |
|---|---|---|
| EP | 3527419 A1 | 8/2019 |
| EP | 2937242 B1 | 8/2021 |
| WO | 2020008095 A1 | 1/2020 |

OTHER PUBLICATIONS

European Search Report, European Application No. 23160009, mailed Jul. 27, 2023, 2 pages.

* cited by examiner

METHOD FOR OPERATING A VEHICLE AND VEHICLE OPERATED BY SUCH A METHOD

CROSS REFERENCE TO RELATED APPLICATIONS

This application claims priority to European Patent Application No. 23160009.9, filed on Mar. 3, 2023, the disclosure and content of which is incorporated by reference herein in its entirety.

TECHNICAL FIELD

The disclosure relates generally to vehicles driven by an internal combustion engine. In particular aspects, the disclosure relates to a method for operating a vehicle and vehicle operated by such a method. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

A vehicle powered by an internal combustion engine usually comprises a battery, an alternator and a starter. The alternator is driven by the engine and charges the battery. The battery is used to provide electrical power to the vehicle, and in particular to the starter, which is used to start the engine.

The lifespan of the battery is known to be lower than the lifespan of the vehicle. Therefore, it is known that the battery needs to be regularly replaced during the lifespan of the vehicle. In addition, the battery may fail during the operation of the vehicle, which can lead to an immobilization of the vehicle. Indeed, if the battery is not able to supply enough electrical energy to the starter to power the starter, then the engine cannot be started. A replacement of the battery is then necessary to start the engine and the vehicle again, which may be inconvenient, in particular if the vehicle is far from a maintenance center.

There is therefore a need for a more reliable vehicle that can start its engine even after a battery failure.

SUMMARY

According to a first aspect of the disclosure, the disclosure relates to a method for operating a vehicle. The vehicle comprises an internal combustion engine, a battery, an alternator, connected to the internal combustion engine and to the battery and configured to charge the battery, a starter, connected to the internal combustion engine and to the battery and configured to start the internal combustion engine, a charger, distinct from the battery and an electrical energy storage system, connected to the starter and to the charger, and distinct from the battery. The method comprises:
  starting the internal combustion engine,
  measuring a state of charge of the battery,
  comparing the measured state of charge with a predetermined threshold value,
  if the measured state of charge is lower than the predetermined threshold value:
    charging the electrical energy storage system with the charger, then
    starting the internal combustion engine with the starter, by powering the starter with the electrical energy storage system, when restarting the internal combustion engine is required.

The first aspect of the disclosure may seek to improve the reliability of the vehicle. A technical benefit may include being able to power the starter with the electrical energy storage system when restarting the engine after a battery failure, while the electrical energy storage system is charged while the internal combustion engine is started, without the need to use the battery.

In some examples, including in at least one preferred example, optionally the electrical energy storage system is a supercapacitor. A technical benefit may include improving the reliability of the vehicle, as the service life of a supercapacitor is longer than the service life of a battery. Another technical benefit may include efficient supply of power to the starter, as a supercapacitor is able to release its stored energy quickly.

In some examples, including in at least one preferred example, optionally during starting the internal combustion engine with the starter, the supercapacitor provides to the starter an electrical power of at least 900 Watts. A technical benefit may include providing a high power to the starter in a short period of time, ensuring that the starter is powered efficiently.

In some examples, including in at least one preferred example, optionally the charger is distinct from the alternator. A technical benefit may include allowing the alternator to recharge only the battery, thus providing more energy to the battery and limiting the discharge of the battery caused by its failure.

In some examples, including in at least one preferred example, optionally the charger is the starter, and, during charging the electrical energy storage system, the starter is operated in a generator mode, producing electrical energy from the mechanical energy of the internal combustion engine to charge the electrical energy storage system. A technical benefit may include simplifying the vehicle manufacturing, as no additional component is required to charge the electrical energy storage system.

In some examples, including in at least one preferred example, optionally the charger is a kinetic energy recovering system, connected to the internal combustion engine and configured to recover and store kinetic energy of the vehicle. A technical benefit may include improving the efficiency of the vehicle, as the electrical energy storage system is charged with energy that might otherwise be lost.

In some examples, including in at least one preferred example, optionally measuring the state of charge of the battery comprises measuring a voltage delivered by the battery. Furthermore, the predetermined threshold value is a voltage value, for example 90% of a nominal voltage of the battery. A technical benefit may include facilitating the implementation of the method, as measuring a battery voltage is simple, and detecting more precisely when the electrical energy storage system needs to be charged.

According to a second aspect of the disclosure, the disclosure relates to a control unit configured to perform the method described here above. A technical benefit may include being able to provide a control unit capable of improving the operation of a vehicle.

According to a third aspect of the disclosure, the disclosure relates to a vehicle comprising an internal combustion engine, a battery, an alternator, connected to the internal combustion engine and to the battery and configured to charge the battery, a starter, connected to the internal combustion engine and to the battery and configured to start the internal combustion engine, a charger, distinct from the battery, and an electrical energy storage system, connected to the starter and to the charger, and distinct from the battery. Furthermore, the vehicle comprises a control unit according to the control unit described here above. The second aspect of the disclosure may seek to improve the reliability of the vehicle. A technical benefit may include being able to power the starter with the electrical energy storage system when restarting the engine after a battery failure, while the electrical energy storage system is charged while the internal combustion engine is started, without the need to use the battery In some examples, including in at least one preferred example, optionally the electrical energy storage system is a supercapacitor. A technical benefit may include improving the reliability of the vehicle, as the service life of a supercapacitor is longer than the service life of a battery. Another technical benefit may include efficient supply of power to the starter, as a supercapacitor is able to release its stored energy quickly.

In some examples, including in at least one preferred example, optionally the charger is distinct from the alternator. A technical benefit may include allowing the alternator to recharge only the battery, thus providing more energy to the battery and limiting the discharge of the battery caused by its failure.

In some examples, including in at least one preferred example, optionally the charger is the starter or a kinetic energy recovering system. A technical benefit may include simplifying the vehicle manufacturing, as no additional component is required to charge the electrical energy storage system, or improving the efficiency of the vehicle, as the electrical energy storage system is charged with energy that might otherwise be lost.

In some examples, including in at least one preferred example, optionally the vehicle is a heavy-duty vehicle, preferably a truck. A technical benefit may include improving the reliability of heavy-duty vehicles and diminishing the cost of operating such heavy-duty vehicles, as battery failure is a frequent cause of immobilization of such vehicles.

According to a fourth aspect of the disclosure, the disclosure relates to a method for operating a vehicle. The vehicle comprises an internal combustion engine, a battery, an alternator, connected to the internal combustion engine and to the battery and configured to charge the battery, a starter, connected to the internal combustion engine and to the battery and configured to start the internal combustion engine, and a supercapacitor, connected to the starter, and distinct from the battery. The method comprises:
  starting the internal combustion engine,
  measuring a state of charge of the battery,
  comparing the measured state of charge with a predetermined threshold value,
  if the measured state of charge is lower than the predetermined threshold value:
    charging the supercapacitor with the starter, the starter being operated in a generator mode, producing electrical energy from the mechanical energy of the internal combustion engine to charge the supercapacitor, then
    starting the internal combustion engine with the starter, by powering the starter with the supercapacitor, when restarting the internal combustion engine is required.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
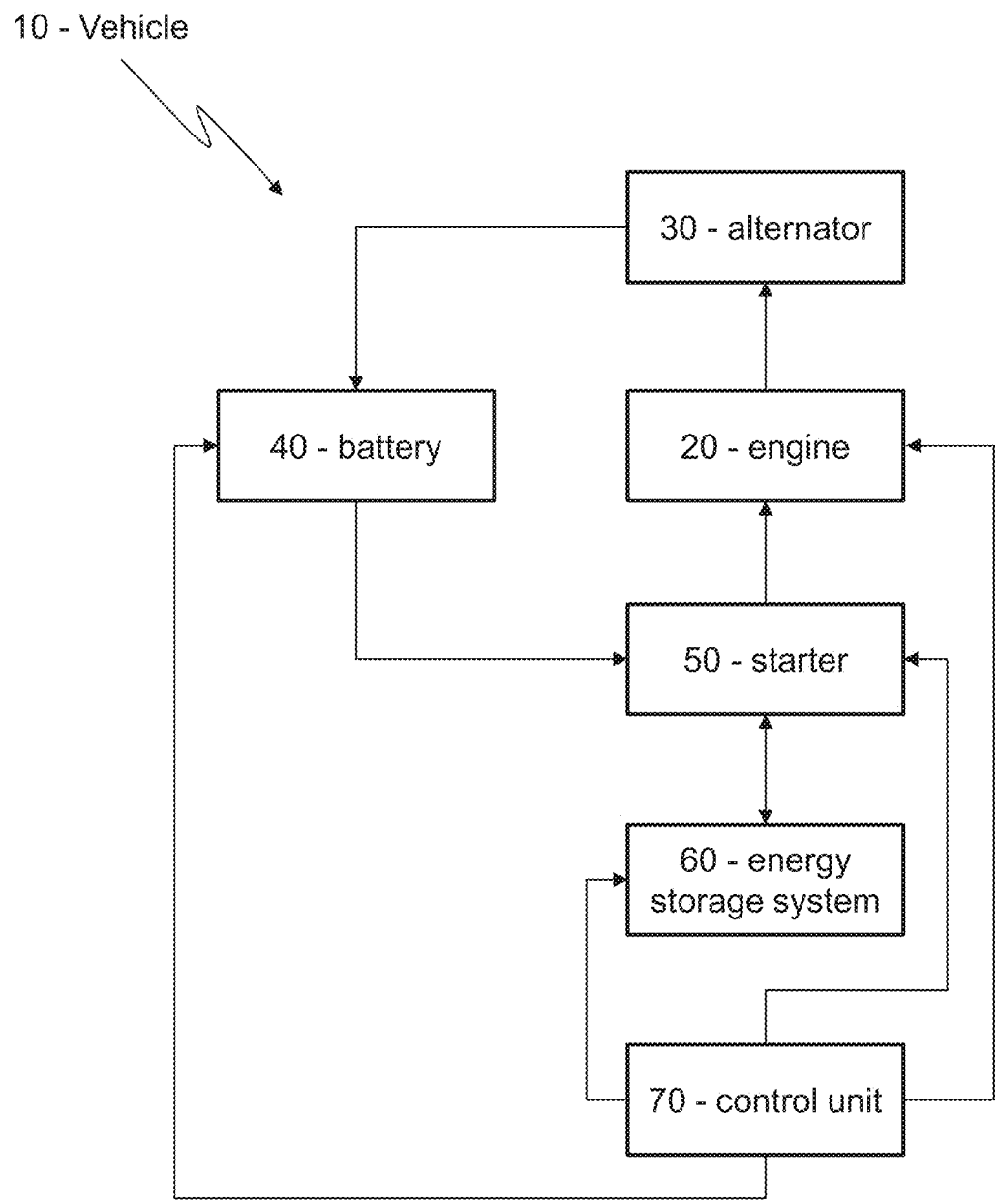
FIG. 1 is an exemplary system diagram of a vehicle according to an example.

A vehicle 10 according to an example is shown in the exemplary diagram of FIG. 1. The vehicle 10 is for example a heavy-duty vehicle, preferably a truck.

In a manner known per se, the vehicle 10 comprises an internal combustion engine 20, an alternator 30, a rechargeable battery 40 and a starter 50. The internal combustion engine 20 is also referred as "the engine" here after.

The alternator 30 is connected to the engine 20 and to the battery 40, and is configured to charge the battery by converting mechanical energy provided by the engine into electrical energy. In other words, when the engine 20 is running, the battery 40 is charged by the alternator 30.

The starter 50, also referred to as a "cranking motor" or "starter motor", is used to rotate, that is to crank, the engine 20 so as to initiate the engine's operation. In other words, the starter is used to start the engine. Therefore, the starter is connected to the engine 20. Here, the starter is an electric starter, that is, is powered by electrical energy.

The battery 40 is connected to the starter 50. During normal operating conditions of the vehicle 10, when starting the engine is needed, the battery 40 is used to power the starter 50, that is, to provide the electrical energy required by the starter to start the engine 20. The battery 40 may also be used to power electrical equipment of the vehicle 10, such as a ventilation system and/or an entertainment system.

The vehicle 10 also comprises an electrical energy storage system 60, which is distinct from the battery 40. The electrical energy storage system 60 is connected to the starter 50.

In the example, the energy storage system 60 is a supercapacitor and is referred to as such in the following description.

In the example, when the engine is running, the starter 50 is able to be operated in a generator mode. In the generator mode, the starter is converting mechanical energy provided by the engine 20 is electrical energy, and is providing this electrical energy to the supercapacitor 60. Therefore, in generator mode, the starter 50 charges the supercapacitor 60, that is, the starter acts as a charger.

The vehicle 10 also comprises a control unit 70, which is connected to the engine 20 and to the battery 40, to surveil the state of the engine and of the battery, and which is connected to the supercapacitor 60 and to the starter 50, to control the starter and the supercapacitor.

The control unit 70 is able to detect if the engine 20 is running or is stopped.

The control unit 70 is able to measure a state of charge of the battery 40. In the example, the state of charge of the battery measured by the control unit is a voltage delivered by the battery, expressed in volts (V).

The control unit 70 is capable of controlling the starter 50: when the control unit detects that the engine 20 is stopped, the control unit can send a signal to the starter 50, so that the starter is energized and then starts the engine. Under normal operating conditions, the starter is energized by the battery, as it is known per se. Conversely, when the control unit detects that the engine 20 is running, the control unit can send a charging signal to the starter, so that the starter is switched to generator mode and charges the supercapacitor 60.

The control unit 70 is capable of controlling the supercapacitor: when the control unit detects that the engine 20 is stopped, the control unit can send a signal to the supercapacitor instructing the supercapacitor to energize the starter 50, that is, to discharge the supercapacitor to provide electrical energy to the starter. Preferably, the control unit 70 send this signal to the supercapacitor only when the control unit detects that the state of charge of the battery is below a predetermined threshold, as explained here below.

Figure 2:
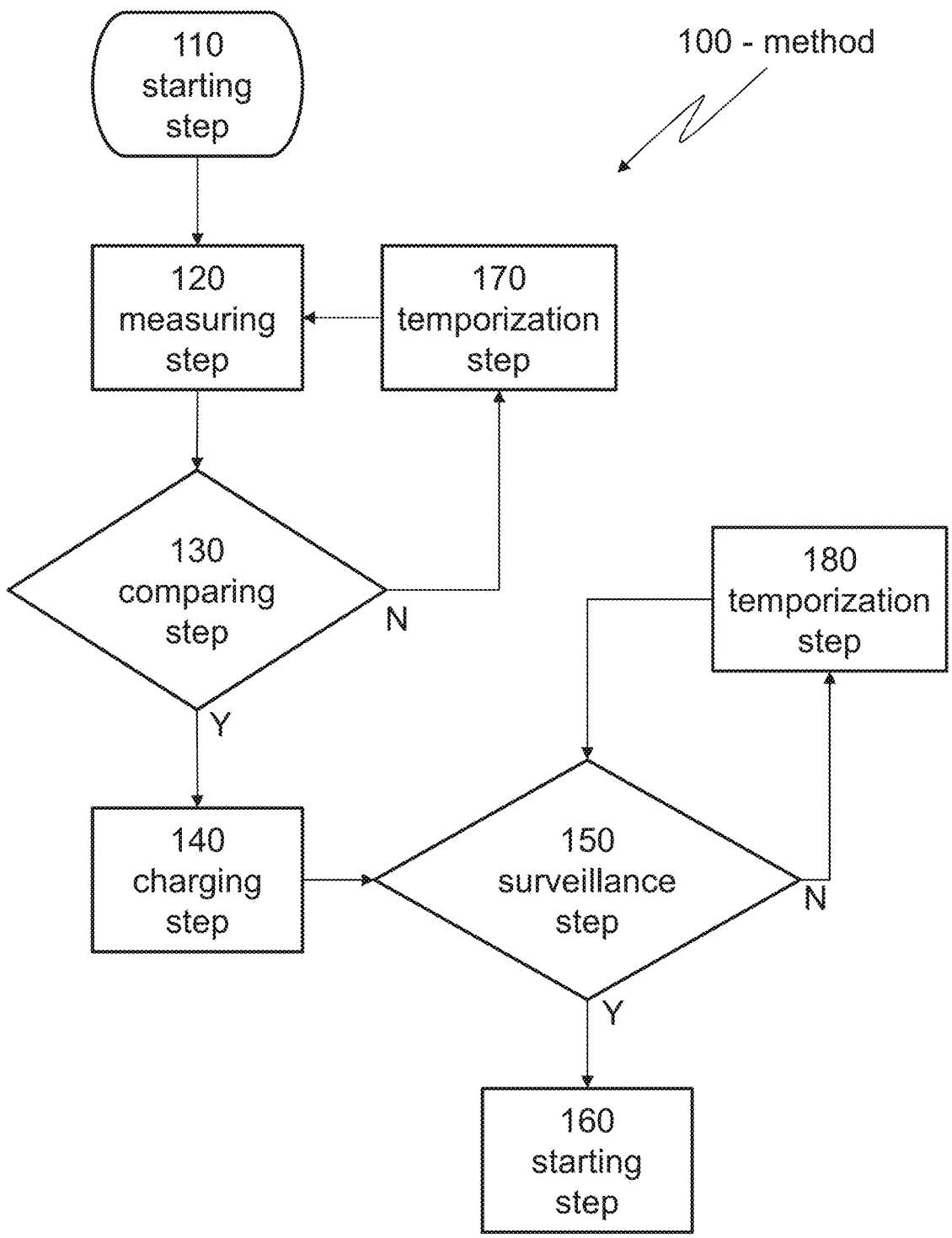
FIG. 2 is an exemplary flowchart of a method according to an example for operating the vehicle of FIG. 1.

With reference to FIG. 2, a method 100 for operating the vehicle 10 is now described.

The control unit 70 is preferably a control unit dedicated to the performing of the method 100, which is also interacting with a main control unit of the vehicle. Alternatively, the control unit is the main control unit of the vehicle 10, which is performing other tasks during the operation of the vehicle.

The method 100 is advantageously performed by the control unit 70.

The control method 100 starts with a starting step 110 of the engine 20.

Then, in a measuring step 120, the control unit 70 measure the state of charge of the battery 40, which consists, in the example, of measuring the voltage provided by the battery, expressed in Volts (V).

Then, in a comparing step 130, the measured state of charge of the battery 40 is compared with a predetermined threshold value, expressed in V. The predetermined threshold value depends of the nominal voltage of the battery 40. If the nominal voltage of the battery is 12V, the predetermined threshold value is for example equal to 11 V. If the nominal voltage of the battery is 24 V, the predetermined threshold value is for example equal to 22 V. In general, the predetermined threshold value is preferably equal to 90% of the nominal voltage of the battery. Practically speaking, a state of charge below the predetermined threshold value is representative of a failure of the battery 40.

Then, if the measured state of the battery is lower than the predetermined threshold value, then the control method 100 continues with a charging step 140, which is performed while the engine 20 is still running. The charging step 140 consists of charging the supercapacitor 60 with the starter 50, which is instructed by the control unit 70 to operate in generator mode. Therefore, it is to be understood that the supercapacitor 60 is advantageously charged only when needed, that is, when the battery 40 is failing. After the charging step, the vehicle 10 continues its operation.

Then, when the engine 20 is stopped, the control method 100 continues with a surveillance step 150, during which the control unit 70 monitors the state of the engine 20.

If the control unit 70 detects that restarting the engine 20 is required, then the control method 100 continues with a starting step 160.

During the starting step 160, the engine 20 is started with the starter 50 and the starter is powered by the supercapacitor 60. Preferably, during the starting step 160, the supercapacitor provides to the starter an electrical power of at least 4000 Watts (W), which is generally sufficient to crank the engine of a truck. Alternatively, and especially when the vehicle 10 is a lighter vehicle, for example a car, the supercapacitor provides to the starter less electrical power, for example at least 900 W.

After the starting step 160, the engine 20 is running and the operation of the vehicle 10 continues in a normal way.

Advantageously, the comparing step 130 of the method 100 is repeated until the measured state of charge of the battery 40 is lower than the predetermined threshold value. In the flowchart of FIG. 2, this repetition of the comparing step 130 is represented by a loop, comprising a step 170, which can be, for example, a temporization step. Thus, as long as the state of charge of the battery is higher than the predetermined threshold, the comparing step 130 is repeatedly performed. In other words, the state of charge of the battery is monitored continuously to detect a potential failure of the battery.

Advantageously, the surveillance step 150 of the method 100 is repeated until the control unit 70 detects that a start of the engine 20 is required. In the flowchart of FIG. 2, this repetition of the surveillance step 150 is represented by a loop, comprising a step 180, which can be, for example, a temporization step. Alternatively, the surveillance step 150 is not repeated in a loop, but is initiated by the control unit 70 when, for example, the main control unit of the vehicle 10 instructs the control unit 70 that a start of the engine is required.

Thanks to the method 100, the engine 20 can be started even after a failure of the battery 40. Indeed, the supercapacitor 60 provides an energy source that can be used to start the engine when the battery has insufficient capacity, for example due to a failure. Therefore, in the event of a battery failure, the vehicle 10 can continue to operate, thus avoiding immobilization of the vehicle. Then, the vehicle can be driven to a maintenance center for the battery 40 to be replaced, without the need for a tow truck or an outside maintenance.

The fact that the supercapacitor 60 is charged by the starter 50 during the charging step 140 is particularly advantageous, as the alternator is therefore not used to charge the supercapacitor. Indeed, a common symptom of a battery failure is that it loses more power than the alternator can supply, thus leading to a continuous discharge of the battery. Here, as all the electrical energy produced by the alternator can be used to charge the battery 40, the discharge of the battery is slowed down, thus limiting its failure.

Furthermore, the vehicle 10 is easy to manufacture, because the supercapacitor can be easily located close to the starter 50, facilitating the electrical connections between these two elements.

The fact that the electrical energy storage system 60 is a supercapacitor is particularly advantageous, as the storage power capacity of a supercapacitor is easily matched to the power required by the starter 50 to start the engine 20. In addition, a supercapacitor is particularly suited to provide all its stored electrical power to the starter in a short amount of time, which makes the use of a supercapacitor particularly adapted. Typically, the supercapacitor 60 is capable of providing the at least 4000 Watts needed by the starter 50 in a few seconds, for example in about one or two seconds. Moreover, the lifespan of the supercapacitor 60 is higher than the lifespan of the battery 40, and at least as long as the lifespan of the vehicle 10. Therefore, there is little risk of the supercapacitor failing when it is needed to energize the starter.

Preferably, the supercapacitor 60 is only used for energizing the starter 50. In other word, the supercapacitor is dedicated to the method 100 described above and is not used to power any other element of the vehicle 10.

In another example, the electrical energy storage system 60 is an auxiliary battery. Preferably, the auxiliary battery is also connected to the battery 40, so that it can provide the same services as the battery 40 in case of failure of the battery 40. In other words, the auxiliary battery provides redundancy to the vehicle 10, thus improving its reliability.

Figure 3:
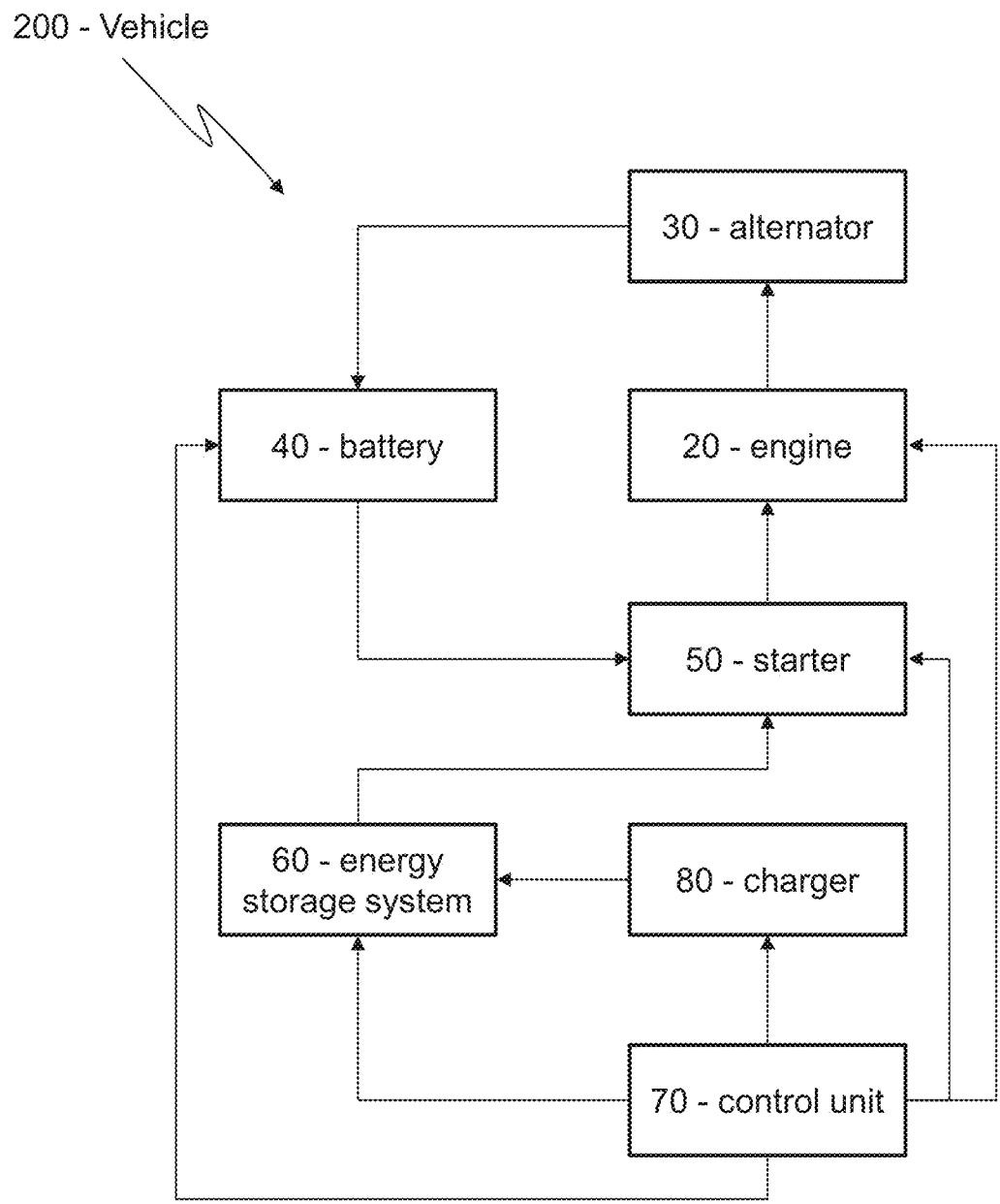
FIG. 3 is an exemplary system diagram of a vehicle according to another example.

A vehicle 200 according to another example is shown in the exemplary diagram of FIG. 3. In this example, the elements similar to those in the example described above have the same references and function in the same way. The following is primarily a description of the differences between the two examples.

The vehicle 200 differs from the vehicle 10 only in that it comprises a charger 80, which is distinct from the battery 40 and from the starter 50, and in that the supercapacitor 60 is charged by the charger 80, not by the starter 50.

Thus, in this example, the charging step 140 consists of charging the supercapacitor 60 with the charger 80. The other steps of the method 100 are identical to those described here above.

For example, the charger 80 can be a kinetic energy recovery system, which is connected to the engine 20 and configured to recover and store kinetic energy of the vehicle 10.

According to another example, the charger 80 can be a solar panel provided on an exterior surface of the vehicle 10.

According to another example, the charger 80 can be the alternator 30. In other words, in this example, then a failure of the battery 40 is detected, the supercapacitor 60 is charged by the alternator 30.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A method for operating a vehicle, the vehicle comprising:
    an internal combustion engine, the vehicle being driven only by the internal combustion engine,
    a battery,
    an alternator, connected to the internal combustion engine and to the battery and configured to charge the battery by converting mechanical energy provided by the engine into electrical energy, the battery being charged only by the alternator,
    a starter, connected to the internal combustion engine and to the battery and configured to start the internal combustion engine, wherein the starter is distinct from each of the battery and the alternator, and
  a supercapacitor, connected to the starter, wherein the starter is able to start the internal combustion engine by being powered with electrical energy to crank the internal combustion engine, the electrical energy powering the starter being provided by the battery or by the supercapacitor,
  wherein the starter is able to operate in a generator mode when the internal combustion engine is running, wherein, in the generator mode, the starter is converting mechanical energy provided by the engine in electrical energy and is providing said electrical energy to the supercapacitor,
  wherein the supercapacitor is only used for powering the starter,
  wherein the supercapacitor is only chargeable by the starter operating in generator mode, the method comprising:
    starting the internal combustion engine,
    measuring a state of charge of the battery,
    comparing the measured state of charge with a predetermined threshold value,
    if the measured state of charge is lower than the predetermined threshold value:
      charging the supercapacitor with the starter when the internal combustion engine is running, the starter being operated in a generator mode, producing electrical energy from the mechanical energy of the internal combustion engine to charge the supercapacitor, then starting the internal combustion engine with the starter, by powering the starter only with the supercapacitor, when restarting the internal combustion engine is required.

2. The method of claim 1, wherein during starting the internal combustion engine with the starter, the supercapacitor provides to the starter an electrical power of at least 900 Watts.

3. The method of claim 1, wherein measuring the state of charge of the battery comprises measuring a voltage delivered by the battery, and wherein the predetermined threshold value is a voltage value.

4. A control unit configured to perform the method of claim 1.

5. The method of claim 3, wherein the predetermined threshold value is 90% of a nominal voltage of the battery.

6. A vehicle comprising:
an internal combustion engine, the vehicle being driven only by the internal combustion engine,
a battery,
an alternator, connected to the internal combustion engine and to the battery and configured to charge the battery by converting mechanical energy provided by the engine into electrical energy, the battery being charged only by the alternator,
a starter, connected to the internal combustion engine and to the battery and configured to start the internal combustion engine, wherein the starter is distinct from each of the battery and the alternator,
a supercapacitor, connected to the starter, and
a control unit,
wherein the starter is able to start the internal combustion engine by being powered with electrical energy to crank the internal combustion engine, the electrical energy powering the starter being provided by the battery or by the supercapacitor,
wherein the starter is able to operate in a generator mode when the internal combustion engine is running, wherein, in the generator mode, the starter is converting mechanical energy provided by the engine in electrical energy and is providing said electrical energy to the supercapacitor, wherein the supercapacitor is only used for powering the starter,
wherein the supercapacitor is only chargeable by the starter operating in generator mode, wherein the control unit is configured to perform a method comprising:
starting the internal combustion engine,
measuring a state of charge of the battery,
comparing the measured state of charge with a predetermined threshold value,
if the measured state of charge is lower than the predetermined threshold value:
charging the supercapacitor with the starter when the internal combustion engine is running, the starter being operated in a generator mode, producing electrical energy from the mechanical energy of the internal combustion engine to charge the supercapacitor, then
starting the internal combustion engine with the starter, by powering the starter only with the supercapacitor, when restarting the internal combustion engine is required.

7. The vehicle of claim 6, wherein the vehicle is a heavy-duty vehicle.

8. The vehicle of claim 6, wherein the vehicle is a truck.

* * * * *